United States Patent [19]

Higgins et al.

[11] 4,115,594
[45] Sep. 19, 1978

[54] EXTRUDABLE COLLAGEN CASING AND METHOD OF PREPARATION

[75] Inventors: Thomas Engel Higgins, Brookfield; Camilla Brems Ross, Hinsdale; Henry John Snella, Oak Forest, all of Ill.

[73] Assignee: Union Carbide Corporation, New York, N.Y.

[21] Appl. No.: 782,959

[22] Filed: Mar. 30, 1977

[51] Int. Cl.$^2$ .............................................. A22C 13/00
[52] U.S. Cl. ................................... 426/140; 426/277; 426/646; 426/652; 426/105
[58] Field of Search ............... 426/135, 138, 140, 277, 426/278, 646, 652, 105

[56] References Cited

U.S. PATENT DOCUMENTS

| | | | |
|---|---|---|---|
| 2,114,220 | 4/1938 | Freudenberg et al. | 426/278 |
| 3,627,542 | 12/1971 | Cohly et al. | 426/140 |
| 3,818,947 | 6/1974 | Rose | 426/135 X |
| 3,887,713 | 6/1975 | Rasmussen et al. | 426/135 |
| 3,928,653 | 12/1975 | Dowell, Jr. et al. | 426/140 X |
| 3,956,512 | 5/1976 | Higgins | 426/140 |

*Primary Examiner*—Robert A. Yoncoskie
*Attorney, Agent, or Firm*—Eugene Lieberstein

[57] ABSTRACT

The extrudable collagen mass of the present invention includes polyoxyethylene sorbitan ester. The additive must be incorporated prior to extrusion of the casing.

8 Claims, 1 Drawing Figure

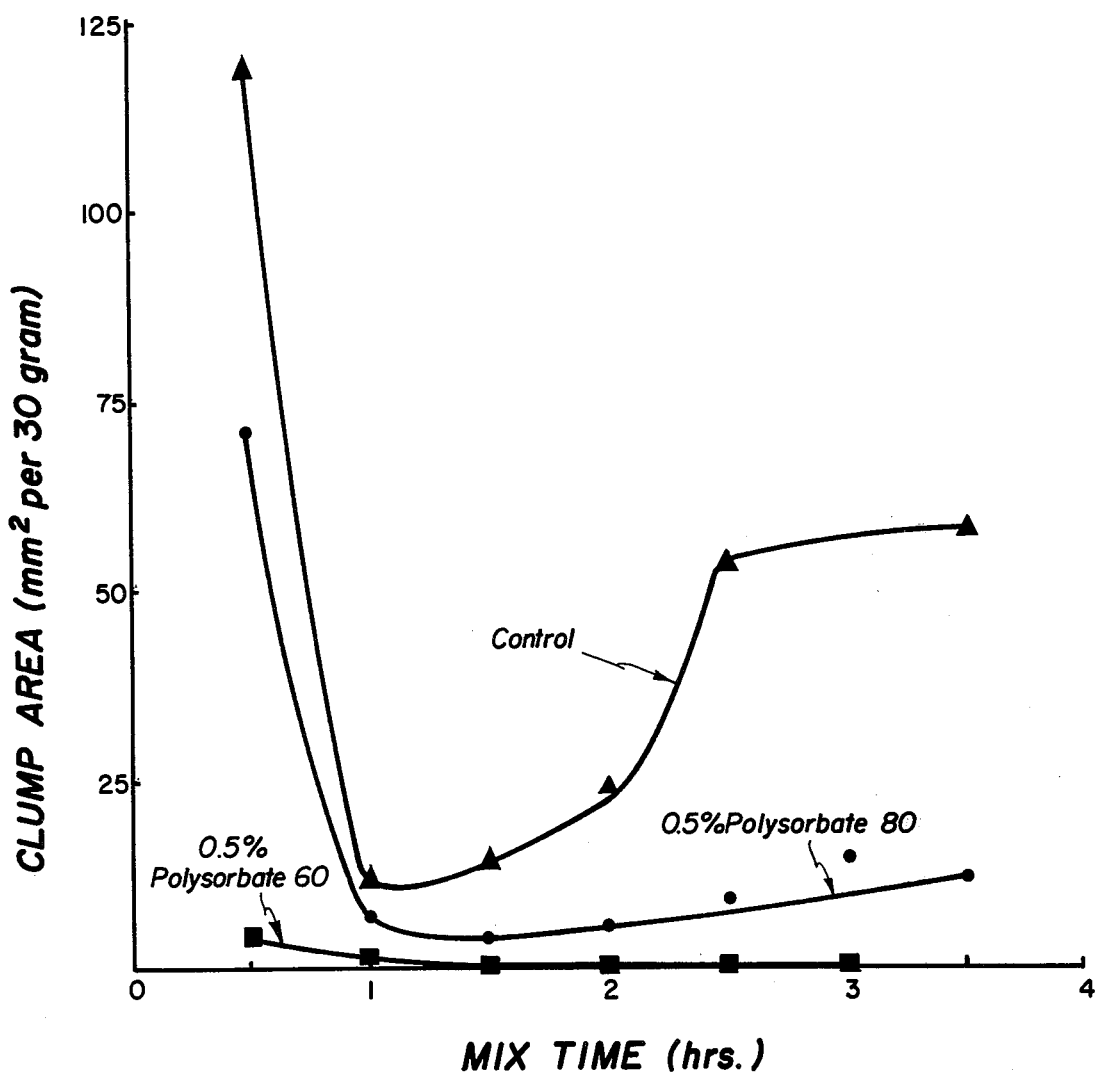

EXTRUDABLE COLLAGEN CASING AND METHOD OF PREPARATION

The present invention relates to extrudable collagen compositions, collagen food casing formed from such compositions and an improved method for making edible collagen tubular food casings containing non-collagenous fibrous additives.

It is a conventional practice in the manufacture of tubular food casing from extrudable collagen compositions to incorporate non-collagenous fibrous additives, particularly cellulosic fibers, as reinforcing agents and as shrink control agents. A suitable procedure for preparing cellulosic fibers for incorporation into low solids collagen compositions is to form a dispersion of cellulosic fibers in water or dilute acid which is then mixed into the collagen mass. Alternatively, a viscous aqueous dispersion of the cellulosic fibers with ground acid swollen collagen is preformulated as is specifically taught in U.S. Pat. No. 3,782,977. The initial preparation of a cellulose fiber dispersion is particularly suited to the manufacture of high solids collagen compositions having collagen concentrations greater than about 6%. The cellulose fiber dispersion is thereafter added to a ground acid swollen collagen mass. The collagen mass containing the cellulose fiber dispersion is then vigorously mixed until the cellulose fibers are uniformly distributed throughout the collagen composition.

Following the mixing of the collagen mass and prior to its extrusion, it is conventional to homogenize and filter the mass for the purpose of substantially reducing the size of any collagen lumps that may still be present in the viscous suspension. The cellulose fibers have been found to have a tendency to aggregate into clumps. This is particularly the case when cellulosic fibers of relatively long length are employed. The cellulosic fiber clumps can cause hesitation in the passage of the formable collagen mass through the extrusion equipment resulting in the formation of weak spots within the casing wall. The number and size of the cellulosic fiber clumps are related to the time the viscous cellulose fiber dispersion is mixed. As the mixing time is increased a point is reached at which reformation and reclumping of the cellulose fiber apparently takes place. This dependence upon mixing time is undesirable since it presents an additional factor which must be taken into account to avoid an unacceptable production run.

It has been discovered in accordance with the present invention that the incorporation of a polysorbate which is a polyoxyethylene sorbitan ester minimizes the formation of cellulosic fiber clumps and significantly reduces its dependency upon mixing time. The preferred polysorbate is selected from either a polyoxyethylene (20) sorbitan monostearate or a polyoxyethylene (20) sorbitan monooleate or a combination thereof.

It has further been discovered that a collagen tubular food casing containing a predetermined amount of the above identified polysorbates will, after shirring, require less pressure to unshirr. A collagen structure containing the polysorbate additive of the present invention will also exhibit the characteristic of inhibiting elongation of the shirred stick. Shirring is the conventional procedure by which long tubular lengths of collagen casing are substantially compressed into short lengths having an accordion like pleated surface of relatively uniform mean diameter. It is generally advantageous to have a short shirred stick length immediately after shirring if blocking can be avoided. Blocking is the tendency of shirred pleats to self-adhere and is measured by measuring the inflation pressure required to unshirr a shirred casing. A low unshirring pressure is desirable and reflects a low degree of blocking. Although it is known to incorporate antiblock additives into formable collagen compositions to improve the antiblock characteristic of the collagen structure as is taught in U.S. Pat. No. 3,956,572, there is no known antiblock additive which will also inhibit elongation of the shirred stick. The latter property permits longer preshirred lengths into a given shirred length. It should be noted that the polysorbate additive in accordance with the present invention concomitantly provides the advantage of both minimizing cellulosic fiber clumps and inhibiting elongation of the shirred stick.

The method for making edible collagen tubular food casings is also improved in accordance with the present invention by the judicious incorporation of a predetermined amount of the aforementioned polysorbate consisting of polyoxyethylene sorbitan ester and more particularly a polyoxyethylene (20) sorbitan monostearate or a polyoxyethylene (20) sorbitan monooleate or a combination thereof. The method is particularly suited to such applications wherein the extruded tubular casing is adapted to be stuffed in a wet condition i.e., where the finished casing is soaked in an aqueous medium during or before such stuffing. A typical application is the stuffing of a tubular collagen casing with meat emulsion such as sausage. A rapid, uniform and substantial amount of water pick-up is desired by some sausage makers to permit maximum stretch of the casing during the stuffing operation. In accordance with the present invention it has been discovered that the water pick-up property of the casing is substantially increased when the polysorbate is added to the collagen composition at some point prior to the extrusion of the tubular casing. The increased water pick-up seen with the addition of polysorbates would be seen irrespective of the presence of cellulose fibers in the casing. Following extrusion the casing is further processed in a conventional manner before shirring.

Accordingly, it is an object of the present invention to provide an improved extrudable collagen mass containing cellulose fibers which will exhibit minimum cellulose fiber clumping.

It is a further object of the present invention to provide an improved edible tubular food casing containing collagen and non-collagenous fibers which will exhibit improved anti-blocking characteristics.

It is a still further object of the present invention to provide an improved method of producing tubular collagen casing which possesses a substantial water pick-up capacity.

Further objects and advantages of the present invention will become apparent from the following detailed description of the invention when taken in connection with the accompanying drawing showing the influence of a polysorbate additive on the relationship of cellulose fiber clump area to mix time for an otherwise conventionally prepared aqueous cellulose dispersion containing subdivided acid swollen collagen particles.

The polyoxyethylene sorbitan esters of the present invention are classified within the broad category of surfactants and more specifically nonionic surfactants, in the Encyclopedia of Chemical Technology, edited by R. E. Kirk and D. F. Othmer, second edition, volume 19 on pages 545–547. The preferred polyoxyethylene sorbitan esters include polyoxyethylene (20) sorbitan monooleate which is commonly referred to as polysorbate 80 and polyoxyethylene (20) sorbitan monostearate which is commonly referred to as polysorbate 60. The definition for polysorbate 80 is also specified in the Merck Index, 8th edition on page 848.

The control curve represents a conventionally prepared cellulose fiber dispersion exclusive of a polysorbate. As the dispersion is mixed the cellulose fiber clump area drops to a relatively low threshold level and then rises again as the mix time is further increased beyond about a two hour time period. However, with the presence of either 0.5% polysorbate 60 or 0.5% polysorbate 80 based upon the total weight of the mass, the formation of clumps is reduced to a minimum within one hour of mixing and substantially remains at this minimum level regardless of any additional mixing. The actual preparation of the control composition is specified in Example I indicated hereinafter.

The procedure for measuring the cellulose fiber clump area is as follows: A 30 gram sample of cellulose fiber dispersion is divided into six equal portions. Each portion is placed between two 0.003 inch polyethylene films and pressed to give a 0.035 inch thick layer of cellulose fiber dispersion. Cellulose fiber clumps one millimeter on a side and larger are measured and counted. The results are expressed as the clump area in square millimeters per 30 grams of cellulose fiber dispersion.

The following examples are set forth as illustrating embodiments of the present invention and are not intended in any way to indicate the limits of the invention.

The acceptable concentration range of polysorbate 60 and polysorbate 80 as extrapolated from all of the examples for the cellulose fiber dispersion, collagen mass composition and finished casing is as follows:

|  | Concentration Range for the Polysorbate 60 and 80 Additive | | |
|---|---|---|---|
|  | Cellulose Fiber Dispersion (% of Dispersion Weight) | Collagen Mass Composition (% of Solids) | Finished Casing (% of Casing Weight) |
| Preferred | .05 – .5 | .1 – 1.5 | .1 – 1.0 |
| Acceptable | .05 – 1.0 | .05 – 2.0 | .05 – 2.0 |

The following example shows use of polysorbate 60, to produce a cellulose fiber dispersion containing a low cellulose fiber clump area. This example also shows an improved ability of casing made using this dispersion and containing polysorbate 60 to pick up water during a soaking operation used by some sausage makers. Polysorbate 60 when present in collagen sausage casing also improved the clarity of the casing when stuffed with fresh sausage emulsion.

EXAMPLE I 1757 pounds of limed beef hide splits are chopped into approximately ½ inch to 2 inch pieces and subjected to an additional lime treatment by charging into a tank together with 150 pounds of lime and sufficient water to give a water to hide ratio of 3.6 to 1. The lime treatment is continued for 25 hours with intermittent agitation after which the limed hide chips are leached with approximately 10 gallons per minute of water for eight hours. The hide chips are then swollen for 13 hours in a hydrochloric acid solution maintained at a pH of 1 using a flow rate of dilute acid of 10 gals./min. At the end of the acid swell treatment, the swollen chips are washed with water at 10 gals./min. for about four hours until a wash water pH of 2.5 is reached. The chips are drained and chilled to about 1° C.

A cellulose fiber dispersion, Dispersion A, Table 1, containing no polysorbate 60, is prepared using the following ingredients:

| | |
|---|---|
| Ground acid-swollen chips | 229 pounds |
| Wood cellulose fibers | 191 pounds |
| Water | 1979 pounds |
| Ice | 800 pounds |
| Concentrated hydrochloric acid 20° Baume | 1 pound |

The wood cellulose fibers used have an average fiber length of about 0.04 inch. Sheets of fibers are separated into convenient pieces, soaked in a portion of the water for about 60 minutes, mixed for about 4 minutes, soaked for an additional 30 minutes and then mixed for about 5 minutes. The rest of the ingredients are then added to the mixer and blended for about 150 minutes. The wood cellulose fiber suspension is smooth, highly viscous, and has a composition of swollen hide solids 1%, wood cellulose fibers 5.6%, and water 93.4%.

TABLE 1

| Cellulose Fiber Dispersions Containing Polysorbate 60 | | |
|---|---|---|
| Cellulose Fiber Dispersion | Polysorbate (% of Dispersion Wt.) | Clump Area (Square Millimeters) |
| A | 0 | 8 |
| B | 0.5 | 0 |

Another cellulose fiber dispersion, Dispersion B, Table 1 containing 0.5% of its weight as polysorbate 60, is prepared as described for dispersion A, above, except for the presence of polysorbate 60 and for differences in mixing times. 11.9 pounds of cellulose fibers, separated into convenient pieces, are soaked for 60 minutes in a mixture of 73.6 pounds of water, 1.0 pound of polysorbate 60 and 0.05 pound of 20° Baume hydrochloric acid. 100 pounds of ice are added and the cellulose fibers are mixed for about 1 minute, soaked for an additional 30 minutes and then mixed for about 2 minutes. 13.5 pounds of ground acid-swollen chips are then added to the mixer and mixed for 90 minutes.

The polysorbate 60 used in this example is a commercially available product under the name of Tween 60.

The cellulose fiber clump area is measured on the cellulose fiber dispersions of this example and is recorded in Table 1. Cellulose fiber dispersion B containing 0.5% polysorbate 60 had no cellulose fiber clumps in 30 grams of dispersion. Cellulose fiber dispersion A had a cellulose fiber clump area of eight square millimeters. The addition of polysorbate 60 thus reduces the cellulose fiber clump area in the cellulose fiber dispersion.

Collagen compositions containing different amounts of polysorbate 60 are prepared using the proportion of ingredients shown in Table 2.

TABLE 2

Ingredients of Collagen Compositions

| Collagen Composition | Poly-Sorbate 60 (% of Composition Solids) | Ground Acid-Swollen Chips 14.4% Solids | cellulose Fiber Dispersion A (No Poly-Sorbate 60) | cellulose Fiber Dispersion B (0.5% Poly-Sorbate 60) | Water |
|---|---|---|---|---|---|
| A | 0 | 59.0 | 28.0 | 0 | 6.0 |
| B | 0.15 | 63.3 | 26.3 | 3.4 | 7.0 |
| C | 0.5 | 63.1 | 18.3 | 11.4 | 7.2 |
| D | 1.3 | 62.5 | 0.0 | 29.7 | 7.8 |

The solid ingredients of the compositions are present in the following proportions:

| Collagen Composition | Ingredients (% of Solids) Ground Acid-Swollen Chips | Wood Cellulose Fibers | Polysorbate 60 |
|---|---|---|---|
| A | 85 | 15 | 0 |
| B | 84.85 | 15 | 0.15 |
| C | 84.5 | 15 | 0.5 |
| D | 83.7 | 15 | 1.3 |

Acid-swollen chips prepared as described above are ground in a meat grinder into pieces substantially between about ⅛ inch and ½ inch in size prior to blending with the viscous cellulose fiber disperson. The temperature during grinding of the chips is controlled so as not to exceed 20° C.

The ground acid-swollen chips, cellulose fiber dispersions and water are mixed for about five minutes at which time the composition is homogeneous and begins to adhere to the mixing equipment. The temperature of the various materials during the mixing step is controlled so as not to exceed 20° C.

After preparing each of the collagen compositions, the composition is fed through a rotary-shear homogenizer by means of a screw extruder and pump. To prevent degradation of the collagen, the homogenizer rotor and stator are cooled with a coolant maintained at a temperature about −5° C.

After homogenization, the blend is pumped through two parallel filters with 0.003 inch slots to break up any remaining collagen lumps and remove any non-dispersed matter.

The filtered collagen blends are pumped and metered through an extrusion nozzle to form a continuous tube of collagen. The extruded tubes are inflated with low-pressure inflation air while being conveyed on horizontal rolls.

The inflated collagen tubing is partially dried and hardened by passing through a predryer at 50° C., then collapsed between nip rolls, neutralized by passing through a dip tank containing 0.06 N ammonium hydroxide, washed by being conveyed through water tanks and then plasticized by being conveyed through a dilute glycerine solution.

The tubing samples are then reinflated with low pressure air, dried in air at 100° C., moisturized in an equalizer at 70% RH and then shirred to give a seven inch shirred stick length by passing through a shirring apparatus. After shirring, the casings are baked at 70° C. for 20 hours, cooled, humidified to 19% moisture by passing humid air through the casing, and packaged.

Tubular collagen casings of this example are evaluated for pickup of water during soaking. A rapid, uniform water pickup is required by some sausage makers who soak the sausage casing prior to stuffing. Soaking permits a maximum stretch of the casing during stuffing with meat emulsion.

For the evaluation of water pickup, a shirred stick of collagen sausage casing is placed on a tared, 1 centimeter diameter rod, weighed and soaked in 37° C. water for 30 seconds. The supporting rod and casing are removed from the soak water, weighed after removing the excess water and the percent weight gain calculated. The shirred stick of casing is evaluated for uniformity of water pickup and for the absence of portions of non-wetted casing. The water pickup results for the collagen sausage casings of this example are given in the following Table.

TABLE 3

Water Pickup of Polysorbate 60 Containing Collagen Sausage Casings

| Casing | Polysorbate 60 (% of Casing Weight) | Water Pickup On Soaking % Wt. Gain | Water Pickup On Soaking Dry Spots Present |
|---|---|---|---|
| A | .0 | 39 | Yes |
| B | 0.09 | 44 | Yes |
| C | 0.3 | 91 | No |
| D | 0.8 | 160 | No |

Casings C and D, made from collagen compositions C and D of Table 2 have a high, uniform water pickup.

The water pickup of casing B, containing 0.09% polysorbate 60, is somewhat better than control casing A containing no polysorbate 60 but dry spots were present after soaking.

The casings containing polysorbate 60 perform without excessive breakage during stuffing with fresh pork sausage emulsion, linking, and frying. The fresh appearance of sausages made using casings B and D containing polysorbate 60 is more attractive due to improved clarity over that of sausages made using casing A which contained no polysorbate 60.

The following example shows the use of polysorbate 60 and polysorbate 80 to reduce the cellulose fiber clump area of cellulose fiber dispersions, to provide high and uniform water pickup when shirred casing is soaked in water, and to improve the clarity of collagen sausage casing. The following example also shows that although a monoglyceride reduced the cellulose fiber clump area of a cellulose fiber dispersion, the monoglyceride did not improve water pickup when the shirred casing was soaked in water.

EXAMPLE II

Cellulose fiber dispersions are prepared as described in Example I. Cellulose fiber clump areas in square millimeters per 30 grams of cellulose fiber dispersion are determined as described in Example I. The results are summarized in Table 4. Cellulose fiber dispersions containing polysorbate 80 (dispersions F, G, and H) or polysorbate 60 (dispersions I, J, K, and L) have lower cellulose fiber clump areas after 1.5 hours of mixing than do the controls (dispersions A, B, C, D, and E). The cellulose fiber dispersion containing Myvatex 25-07 has a lower cellulose fiber clump area than do the controls. Further evaluation of Myvatex 25-07, the results of which follow in this example and in Example V, reveals some disadvantages in the use of Myvatex 25-07.

The polysorbate 60 and polysorbate 80 used in this example are Tween 60 and Tween 80, products of ICI United States, Inc. Wilmington, Delaware. The monoglyceride used in this example is Myvatex 25-07, a distilled monoglyceride derived from hydrogenated vegetable oil and is a product of Eastman Chemical Products, Inc.

TABLE 4

Cellulose Fiber Clump Area of Cellulose Fiber Dispersions

| Cellulose Fiber Dispersion | Polysorbate Additive Type | % | Cellulose Fiber Clump Area After 1.5 Hour Mixing ($mm^2$ per 30 grams dispersion) |
|---|---|---|---|
| A | Control | 0 | 13 |
| B | Control | 0 | 28 |
| C | Control | 0 | 7 |
| D | Control | 0 | 8 |
| E | Control | 0 | 11 |
| Average for Controls | | | 13 |
| F | Polysorbate 80 | 0.15 | 11 |
| G | Polysorbate 80 | 0.50 | 5 |
| H | Polysorbate 80 | 0.50 | 3 |
| Average for Polysorbate 80 | | | 6 |
| I | Polysorbate 60 | 0.15 | 1 |
| J | Polysorbate 60 | 0.50 | 0 |
| K | Polysorbate 60 | 0.50 | 0 |
| L | Polysorbate 60 | 0.50 | 0 |
| Average for Polysorbate 60 | | | 0.25 |
| M | Myvatex 25-07 | 0.15 | 5 |

Further measurements of cellulose fiber clump areas are made during mixing of three of the cellulose fiber dispersions of Table 4. The results are shown in Table 5 and graphically displayed in the single FIGURE.

TABLE 5

Change in Cellulose Fiber Clump Area with Mix Time

| Cellulose Fiber Dispersion | Polysorbate Additive Type | % | Cellulose Fiber Clump Area At The Indicated Hour Of Mixing time (square millimeters per 30 grams) | | | | | | |
|---|---|---|---|---|---|---|---|---|---|
| | | | 0.5 | 1.0 | 1.5 | 2.0 | 2.5 | 3.0 | 3.5 |
| A | Control | 0 | 118 | 12 | 13 | 23 | 55 | | 60 |
| G | Polysorbate 80 | 0.50 | 70 | 8 | 5 | 6 | 11 | 17 | 8 |
| J | Polysorbate 60 | 0.50 | 4 | 1 | 0 | 0 | 0 | 0 | |

Polysorbate 60 permits preparation of cellulose fiber dispersions with cellulose fiber clump areas below one square millimeter per 30 grams of dispersion.

Collagen sausage casings were prepared as described in Example I and included three of the cellulose fiber dispersions E, H, L, and M of Table 4. The tubular collagen casings are evaluated for water pickup as described in Example I. The results are summarized in Table 6.

TABLE 6

Water Pickup of Collagen Sausage Casing Containing Polysorbate Additives and Monoglyceride

| Cellulose Fiber Dispersion | Additive Type | % Of Dispersion Weight | % Of Collagen Composition Solids | % Of Casing Weight | % Of Casing Weight | Dry Spots Present |
|---|---|---|---|---|---|---|
| E | None | 0 | 0 | 0 | 47 | Yes |
| H | Polysorbate 80 | 0.5 | 1.3 | 0.8 | 89 | No |
| L | Polysorbate 60 | 0.5 | 1.3 | 0.8 | 207 | No |
| M | Myvatex 25-07 | 0.15 | 0.4 | 0.2 | 71 | Yes |

The water pickup of collagen sausage casings made from cellulose fiber dispersions H and L containing polysorbate 80 or polysorbate 60 is greater and more uniform than for casing made from control dispersion E which contains no polysorbate. Although the water pickup of collagen sausage casing containing Myvatex 25-07 was increased over that of the control, it was not uniform as seen by the presence of dry spots.

The casings containing polysorbate 60 and polysorbate 80 perform without excessive breakage during stuffing with fresh pork sausage emulsion, during linking, and during drying. The appearance of fresh sausages made using casings made from dispersions H and L containing polysorbate 60 and polysorbate 80 was more attractive than the control due to improved casing clarity. Fresh sausages made using casing containing Myvatex 25-07 did not have improved clarity over sausages made with casing having no monoglyceride additive.

The following example compares incorporation of a polysorbate into the collagen composition with application to collapsed collagen tubing. Unexpectedly, application to collapsed collagen tubing does not improve water pickup after soaking of shirred sticks as effectively as does incorporation into the collagen composition prior to extrusion. The improved water pickup property should be the same irrespective of the presence of cellulose fibers in the collagen composition.

EXAMPLE III

Collagen composition A of Example I, Table 2 is used to prepare a series of shirred collagen sausage casings treated with different levels of polysorbate 60. Dip bath processing is modified in that various levels of polysorbate 60 are added to the last dip bath but otherwise the dip bath procedure of Example I is employed. Shirring conditions are modified to give an eleven inch shirred length rather than the customary seven inches, but otherwise the procedure of Example I is used to produce shirred collagen sausage casings.

A second series of shirred collagen sausage casings is also prepared using collagen compositions B, C, and D of Example I, Table 2, which contained respectively 0.15, 0.5, and 1.3% of the composition solids as polysorbate 60. Shirring conditions were modified to give an eleven inch shirred length rather than the customary seven inch length, but otherwise the procedure of Example I is used to produce shirred collagen sausage casings.

Table 7 compares water pickup for casings in these two series.

TABLE 7

Water pickup of Polysorbate 60 Casings

| Casing | Polysorbate 60 | | | Water Pickup | |
|---|---|---|---|---|---|
| | % Of Dip Solution Weight | % Of Collagen Composition Solids | % Of Finished Casing Weight | % Of Casing Weight | Dry Spots |
| A | 0 | 0 | 0 | 102 | Yes |
| B | 0.03 | 0 | 0.1 | 113 | No |
| C | 0.11 | 0 | 0.4 | 103 | No |
| D | 0.33 | 0 | 1.3 | 112 | No |
| E | 1.0 | 0 | 4 | 118 | No |
| F | 0 | 0.15 | 0.09 | 99 | No |
| G | 0 | 0.5 | 0.3 | 152 | No |
| H | 0 | 1.3 | 0.8 | 167 | No |

The water pickup percentage of casing A, an eleven inch shirred length casing containing no polysorbate 60, is 2 to 2½ times greater than that of similar casings having a seven inch shirred length (casing A, Table 3, Example I and casing E, Table 6, Example II).

Incorporation of polysorbate 60 into the dip bath as in casings B, C, D, and E removes dry spots seen in the untreated control. The dip treated casings have a water pickup percentage that is only marginally greater than the control.

Incorporation of polysorbate 60 into the collagen composition above 0.09% of the finished casing weight as in casings G and H removes dry spots and markedly increases the water pickup.

The following example describes the anti-block properties of polysorbate 80 and polysorbate 60 on shirred collagen casing.

EXAMPLE IV

Cellulose fiber dispersions E, H, and L of Table 4, Example II are used to prepare shirred collagen sausage casing as described in Example I. Shirring conditions are modified to produce casings having different shirred lengths.

Shirred lengths are measured immediately after shirring and are all less than the final seven inch length of the finished casing. It is generally advantageous to have a short shirred length immediately after shirring if blocking can be avoided. Blocking is the tendency of shirred pleats to self-adhere and is measured by measuring the inflation pressure required to unshirr a shirred casing. A low unshirring pressure is desirable and reflects a low degree of blocking.

The following Table 8 summarizes the pressures to unshirr the casings. The casings are listed in order of decreasing pressures to unshirr.

TABLE 8

Anti-Block Properties of Polysorbate 60 and Polysorbate 80

| Casing | Polysorbate | | Shirred Stick Length (inch) | Pressure To Unshirr (mm of Mercury) |
|---|---|---|---|---|
| | Type | % of Casing Weight | | |
| A | Control | 0 | 5.3 | 78 |
| B | Polysorbate 80 | 0.8 | 5.5 | 46 |
| C | Polysorbate 60 | 0.8 | 5.4 | 45 |
| D | Polysorbate 80 | 0.8 | 5.3 | 42 |

TABLE 8-continued

Anti-Block Properties of Polysorbate 60 and Polysorbate 80

| Casing | Polysorbate | | Shirred Stick Length (inch) | Pressure To Unshirr (mm of Mercury) |
|---|---|---|---|---|
| | Type | % of Casing Weight | | |
| E | Control | 0 | 6.0 | 35 |
| F | Polysorbate 60 | 0.8 | 6.0 | 28 |
| G | Control | 0 | 6.5 | 27 |
| H | Polysorbate 60 | 0.8 | 6.8 | 21 |
| I | Polysorbate 80 | 0.8 | 6.1 | 20 |

Table 8 shows that for casings of equivalent shirred length, the incorporation of polysorbate 60 and polysorbate 80 reduced the pressure required to unshirr collagen casings. Thus, casings B, C, and D containing polysorbate 60 or polysorbate 80 had lower unshirring pressures than the control casing A having an equivalent shirred length. Similarly, casings F and I, containing polysorbate 60 or polysorbate 80, respectively, had lower unshirring pressures than the control casing E having an equivalent shirred length. Also, casing H containing polysorbate 60 had a lower unshirring pressure than the control casing G having an equivalent shirred length.

Table 8 also shows that the shorter the shirred length, the higher the pressure to unshirr. It is also evident that the shorter the shirred length, the greater the percent reduction of unshirring pressure with the incorporation of polysorbate 60 and polysorbate 80. Thus, casings B, C, and D containing polysorbate 60 and polysorbate 80 and having a short shirred length, have markedly lower unshirring pressures than does the short shirred length control casing A.

EXAMPLE V

This example shows that Myvatex 25-07 although reducing blocking of the casing also gives an unacceptably long shirred stick length.

Cellulose fiber dispersions E and M of Table 4, Example II are used to prepare shirred collagen sausage casings as described in Example I. The results of a stick length and of a blocking evaluation are shown in Table 9. Shirring conditions were held constant during the preparation of the two casings of this example.

Table 9

| Casing | Additive | | Shirred Stick Length (inch) | Pressure to Unshirr (mm Hg) |
|---|---|---|---|---|
| | Type | % of Casing Weight | | |
| A | None (Control) | | 6.5 | 27 |
| B | Myvatex 25-07 | 0.2 | 7.7 | 16 |

Casing B, containing Myvatex 25-07, has a lower unshirring pressure than does the control. The shirred stick length is increased over that of the control casing. An increased shirred stick length is not generally desirable. An increased shirred stick length can cause difficulty in packaging of the casing. An excessive shirred stick length can cause difficulty in sausage making, if the length is greater than that of the stuffing horn on which the casing is placed just prior to being filled with sausage emulsion.

What is claimed is:

1. An extrudable collagen mass comprising an additive of polyoxyethylene sorbitan ester selected from the group consisting of polyoxyethylene (20) sorbitan monostearate and polyoxyethylene (20) sorbitan monoleate, in an amount between about 0.05 to about 2 percent based upon the total weight of the collagen mass.

2. An extrudable collagen mass as defined in claim 1 wherein said mass further comprises a cellulose fiber dispersion.

3. An extrudable collagen mass as defined in claim 1 wherein said polyoxyethylene sorbitan ester is present in said mass in an amount of between about 0.1 to about 1.5 percent of the total weight of the mass.

4. An edible tubular food casing comprising collagen characterized by the presence of polyoxyethylene sorbitan ester selected from the group consisting of polyoxyethylene (20) sorbitan monostearete and polyoxyethylene (20) sorbitan monoleate, in an amount based upon the total weight of the casing of between at least 0.05 percent to 2 percent.

5. An edible tubular food casing as defined in claim 4 wherein said casing further comprises non-collagenous cellulose fibers.

6. An edible tubular food casing as defined in claim 4 wherein said polyoxyethylene sorbitan ester is present in said casing in an amount of between about 0.1 to about 1 percent of the total weight of the casing.

7. In the method of producing a tubular collagen casing wherein a collagen mass is extruded into a tubular body, the improvement of which comprises; incorporating a polyoxyethylene sorbitan ester selected from the group consisting of polyoxyethylene (20) sorbitan monostearate and polyoxyethylene (20) sorbitan monoleate, as an additive in the formation of said collagen mass prior to said extrusion step in an amount between 0.05 to 2 percent based upon the total weight of the collagen mass.

8. In the method of producing a tubular collagen casing as defined in claim 7 wherein a cellulose fiber dispersion is included in said collagen mass wherein said additive is incorporated into said dispersion.

* * * * *